United States Patent
Sulm et al.

(10) Patent No.: US 7,121,184 B2
(45) Date of Patent: Oct. 17, 2006

(54) SEATING SYSTEM FOR A WEAPON OPERATOR OF A MILITARY VEHICLE

(75) Inventors: Günther Sulm, Vienna (AT); Hans Weber, Vienna (AT)

(73) Assignee: Steyr-Daimler-Puch Spezialfahrzeug AG & Co. KG, Vienna (AT)

( * ) Notice: Subject to any disclaimer, the term of this patent is extended or adjusted under 35 U.S.C. 154(b) by 112 days.

(21) Appl. No.: 10/913,703

(22) Filed: Aug. 6, 2004

(65) Prior Publication Data

US 2005/0072295 A1    Apr. 7, 2005

(30) Foreign Application Priority Data

Aug. 7, 2003    (AT) ............................... A 1247/2003

(51) Int. Cl.
   *F41G 5/20*    (2006.01)

(52) U.S. Cl. ................... 89/41.22; 89/41.21; 89/41.14

(58) Field of Classification Search ............... 89/41.21, 89/41.22, 41.14
   See application file for complete search history.

(56) References Cited

U.S. PATENT DOCUMENTS

| | | | | |
|---|---|---|---|---|
| 2,689,697 A | * | 9/1954 | Stanley | ................ 244/122 AH |
| 5,626,203 A | * | 5/1997 | Habib | ........................ 180/274 |
| 5,679,918 A | * | 10/1997 | Korpi et al. | ................ 89/36.08 |
| 6,293,588 B1 | * | 9/2001 | Clune | ........................ 280/808 |

* cited by examiner

Primary Examiner—Stephen M. Johnson
(74) Attorney, Agent, or Firm—Andrew Wilford

(57) ABSTRACT

A seating system for a weapon operator of a military vehicle such as a tank has adjustable chest and back supports which can be locked to secure the weapon operator in position with respect to weapon controls in spite of highly dynamic changes in the position of the vehicle.

15 Claims, 2 Drawing Sheets

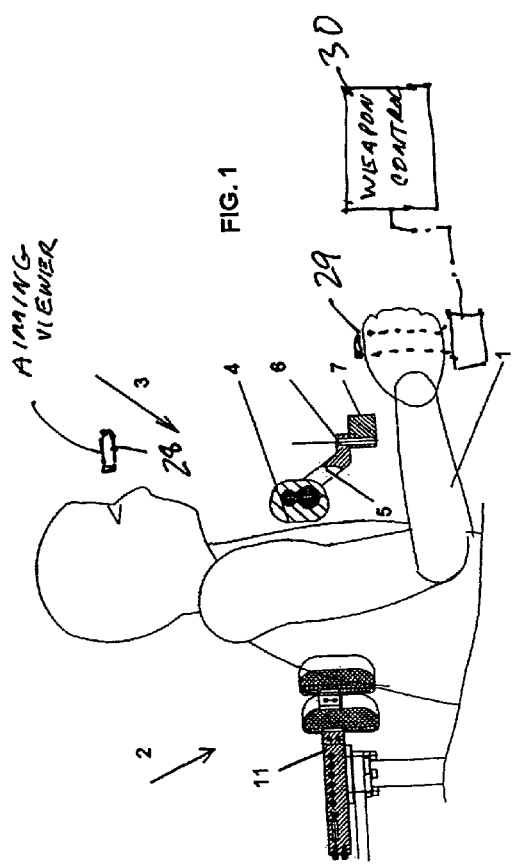
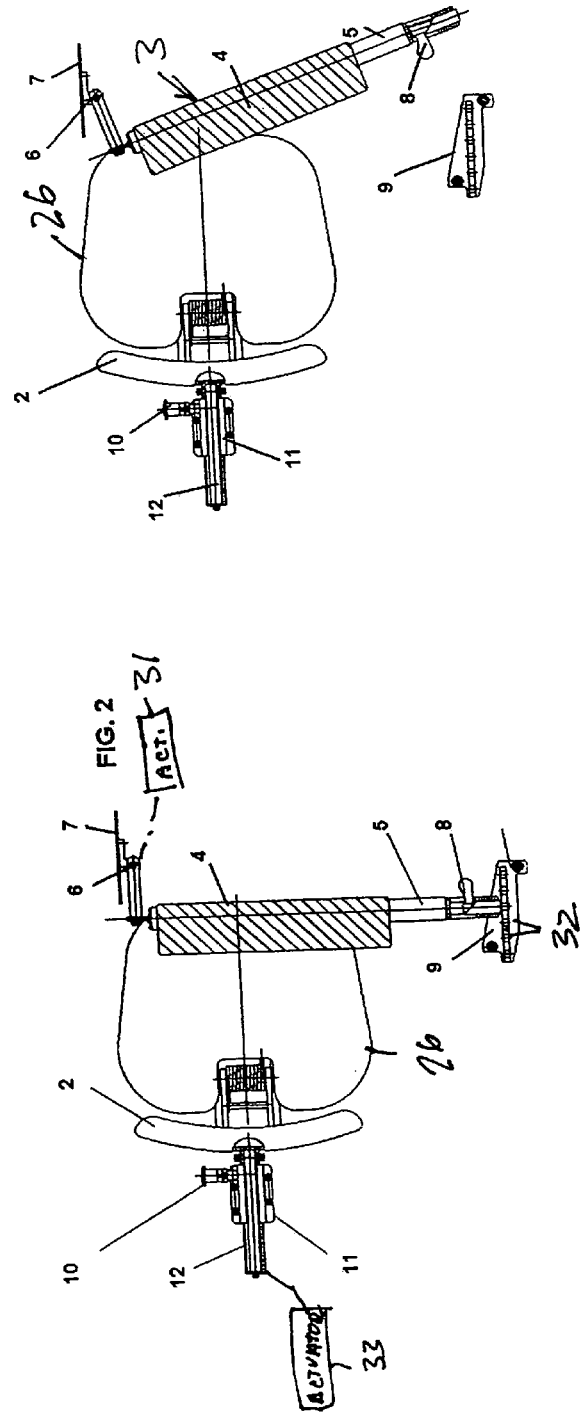
FIG. 1
FIG. 2
FIG. 3

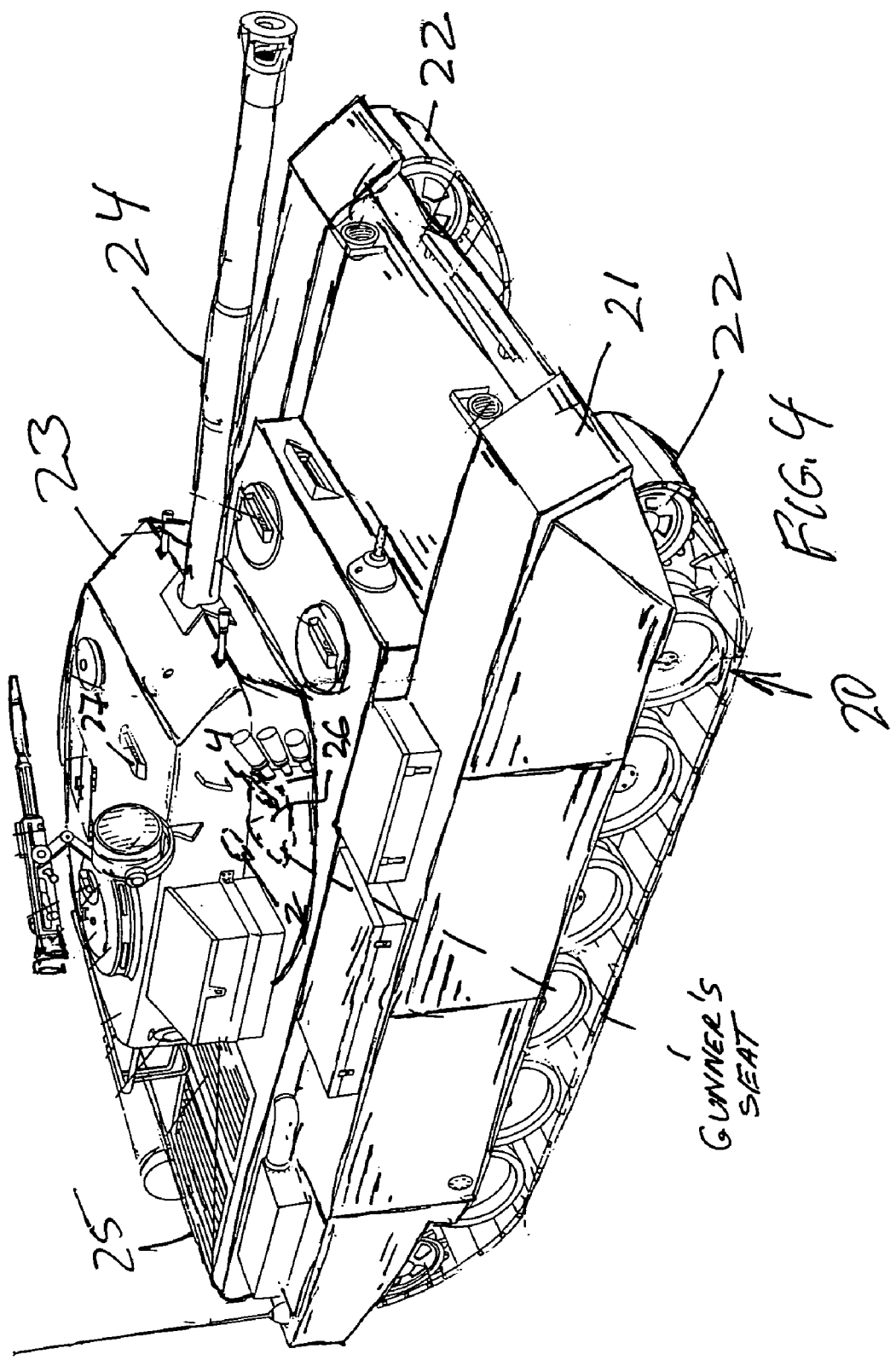

SEATING SYSTEM FOR A WEAPON OPERATOR OF A MILITARY VEHICLE

FIELD OF THE INVENTION

Our present invention relates to a seating system for a weapon operator, equipment operator or other military personnel for a military vehicle and, more particularly, for the weapons operator of a tank, mobile gun or like military vehicle.

BACKGROUND OF THE INVENTION

Modern military vehicles, for example, tanks, have especially high powered drive systems and are capable of operating at high speeds over very rough terrain. They are often equipped with multiaxially stabilized weapon systems enabling precise targeting even in highly dynamic engagements in battlefield situations.

The targeting of weapons systems often leaves much to be desired when, as a result of inertia, the dynamic movements of the vehicle, inherent lags in response and the inability of the weapons operator to maintain a particular position, the weapon trajectory may be inaccurate. It is, therefore, important, especially for precise control of a weapon under highly dynamic conditions for the weapon operated to be able to maintain a particular posture, position or stance.

OBJECTS OF THE INVENTION

It is, therefore, the principal object of the present invention to provide a seating system or arrangement for particularly a weapon operator of a military vehicle, which can permit that operator to properly service the weapon system, i.e. control the movements and targeting of the weapon and maintain a targeting posture under extreme travel conditions, greatly varying dynamic loads and unexpected and uncontrollable vehicle movements.

It is also an object of the invention to provide a seating system for a weapon operator for a weapon system in a military vehicle, especially a tank which can insure a fixed positioning of the operator against irregular movements of the vehicle.

It is also an object of the invention to provide a seating arrangement for the weapon operator which will guarantee accurate aiming and weapon control under all travel conditions of a military vehicle, especially a tank, in a wide variety of battlefield conditions.

SUMMARY OF THE INVENTION

These objects and others which will become apparent hereinafter are attained, in accordance with the invention in a seating system wherein a chest support and a back support are provided and whereby the chest support and/or the back support can be adjustable at least in the horizontal direction and can be arrested or locked so that the weapon operator is fixed between the chest support and the back support in a physiologically optimal position with respect to the service or actuating elements of the weapon system. More particularly, the seating system can comprise:

a seat located proximal to at least one control for a weapon in a military vehicle;

a chest support positionable to engage and brace the chest of a weapon operator seated on the seat;

a back support positionable to engage and brace the back of the weapon operator on the seat; and at least one lockable positioning device for at least one of the supports for securing the weapon operator between the chest support and the back support in a physiologically optimum position relative to the control.

With the seating arrangement according to the invention, the weapons operator or other service personnel in the military vehicle, for example, the targeting personnel for the weapon, can be stabilized in a manner which is optimal for the weapon system and with respect to the weapon system so that reliable targeting and firing is possible.

To minimize the pressure of the chest support and the back support of the weapon operator, these members can advantageously be cushioned. For securing the chest support, it has been found to be advantageous, in accordance with the invention, to provide a shape-locking or force-locking device.

So that the weapon operator can rapidly adjust the supports to our proper positions and can easily disengage the supports, e.g. for rapid escape from the vehicle, the invention provides that the chest support is mounted on an arm which can be swingable toward and away from the weapon operator.

Alternatively or in addition, the chest support at least, but preferably both the chest support and back support, can be provided with electric, pneumatic or hydraulic actuators for automatically or by operator control, moving these supports into and out of engagement with the operator. The back support may be mounted on a profile or shaped bar which can be displaceable linearly in a guide in which that bar can be locked, toward and away from the back of the operator. Such an electric, pneumatic or hydraulic actuator can also be provided for that profile.

BRIEF DESCRIPTION OF THE DRAWING

The above and other objects, features, and advantages will become more readily apparent from the following description, reference being made to the accompanying drawing in which:

FIG. 1 is a side view partly broken away and in highly diagrammatic form showing a seating system in accordance with the invention, the weapon operator being only diagrammatically seen;

FIG. 2 is a plan view, also partly broken away, of the seating system of FIG. 1 without the weapon operator;

FIG. 3 is a view similar to FIG. 2 with the chest support shown swung away from the seating position; and FIG. 4 is a perspective view of a tank showing the location of the seating system in the military vehicle.

SPECIFIC DESCRIPTION

In FIG. 4, we have shown a military vehicle 20 in the form of a tank having a tank body 21, treads 22, a turret 23 and a weapons system of which only the main gun 24 has been illustrated. An engine for driving the treads is received in the engine compartment 25 and in the gunners position, a seat 26 is provided at which the gunner can be seated to control the weapons system, namely the gun 24 and utilize an aiming viewer which may have its optics, in part, at 27. The back rest or support is diagrammatically shown at 2 in FIG. 4 while the chest support has been diagrammatically shown at 4 in this figure.

As can be seen especially from FIG. 1, the upper portion of the body of the weapon operator 1 can be positioned on the seat 26 and secured in an appropriate position with respect to the aiming or targeting viewer 28 and, for example, a joystick 29 of the weapon control 30, between an adjustable back support 2 and an adjustable chest support 3 in a stable position with respect to the weapon system. The back support 2 and the chest 3 are rigidly connected with the weapon system so that dynamic movements do not affect the relative position of the weapon operator and the weapon control.

The chest support 3 has a cushion 4 where it comes into engagement with the chest of the weapon operator 1, e.g. of a foamed synthetic resin. The cushioned chest support 3 is disposed on an arm 5 which is swingable about an axis 6, e.g. a vertical axis (compare FIGS. 2 and 3) about which the arm can pivot. The pivot itself is mounted by a holder 7 on the weapon carrying portion of the vehicle, in this case, the body of the turret. The seat 26 is likewise mounted on the turret. An electric, pneumatic or hydraulic actuator may be connected with the chest support as shown at 31 in FIG. 2. At the opposite end of the arm 5 a locking pin 8 is spring loaded into engagement with one or another of the holes 32 of a bracket 9 likewise secured to the body of the turret.

The cushioned back support 2 likewise can be brought against the operator and can be carried for that purpose on an elongated profile member 12 which is displaceable linearly in the guide 11. It can be locked in the guide by a spring-loaded pin 10. The pins can be withdrawn from their holes manually.

The described system can be modified in various ways, for example, such that only the chest support or the back support is adjustable and it is possible to provide the adjustability so that it is in the vertical direction instead of the horizontal direction as shown. In the case of the back support, the latter may be displaceable on a vertical rail supported on the guide 11. A hydraulic, pneumatic or electric actuator can be provided at 33 for the profile 12 as desired.

The chest support 3 can be swung away from the operator (FIG. 3) to allow escape from the tank if desired. When the supports are locked in place, they hold the operator 1 securely in position with respect to the weapon control in spite of any variations in the position of the vehicle, i.e. in spite of pitching, yawing or rolling of the vehicle and even in the case of sudden vertical or horizontal movements.

We claim:

1. A seating system for a weapon operator of a military vehicle, the seating system comprising:
 a seat located proximal to at least one control for a weapon in the military vehicle and adapted to hold the weapon operator;
 a chest support positionable to engage and brace the chest of the weapon operator on said seat;
 mounting means rigidly fixing the chest support relative to the weapon system;
 a back support positionable to engage and brace the back of the weapon operator on said seat;
 mounting means rigidly fixing the back support relative to the weapon system; and
 a lockable positioning device in one of the mounting means for positioning the respective support and thereby securing the weapon operator between said chest support and said back support in a physiologically optimum position relative to said control.

2. The seating system defined in claim 1 wherein at least one of said chest support and said back support is cushioned.

3. The seating system defined in claim 2 wherein both said supports are cushioned.

4. The seating system defined in claim 3 wherein the mounting means of the chest support is provided with said lockable positioning device and said lockable positioning device includes a bracket affixed to a body of said vehicle.

5. The seating system defined in claim 4 wherein said lockable positioning device includes an element releasably seatable in said bracket.

6. The seating system defined in claim 5 wherein said lockable positioning device includes an arm swingable toward and away from said weapon operator.

7. The seating system defined in claim 6 wherein said lockable positioning device includes an electronic, pneumatic or hydraulic actuator for said chest support.

8. The seating system defined in claim 1 wherein said lockable positioning device is provided for the mounting means of said back support and includes a profile on which said back support is mounted for movement toward and away from said weapon.

9. The seating system defined in claim 8 wherein said lockable positioning device includes an electric, pneumatic or hydraulic actuator for said profile.

10. The seating system defined in claim 1 wherein the mounting means of the chest support is provided with said lockable positioning device and said lockable positioning device includes a bracket affixed to a body of said vehicle.

11. The seating system defined in claim 10 wherein said lockable positioning device includes an element releasably seatable in said bracket.

12. The seating system defined in claim 11 wherein said lockable positioning device includes an arm swingable toward and away from said weapon operator.

13. The seating system defined in claim 12 wherein said lockable positioning device includes an electronic, pneumatic or hydraulic actuator for said chest support.

14. The seating system defined in claim 1 wherein each of the mounting means of said supports is provided with a respective lockable positioning device.

15. A seating system for a weapon operator of a military vehicle, the seating system comprising:
 a seat located proximal to at least one control for a weapon in the military vehicle and adapted to hold the weapon operator;
 a chest-support cushion positionable to engage and brace the chest of the weapon operator on the seat;
 mounting means rigidly fixing the chest-support cushion relative to the weapon system;
 a back-support cushion positionable to engage and brace the back of the weapon operator on the seat;
 mounting means rigidly fixing the back-support cushion relative to the weapon system; and
 a lockable positioning device in one of the mounting means for positioning the respective cushion and thereby securing the weapon operator between the chest cushion and the back cushion in a physiologically optimum position relative to the control.

* * * * *